United States Patent
Li (10) Patent No.: US 12,532,306 B2
(45) Date of Patent: Jan. 20, 2026

(54) DATA TRANSMISSION SCHEDULING METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 581 days.

(21) Appl. No.: 17/997,431

(22) PCT Filed: Apr. 29, 2020

(86) PCT No.: PCT/CN2020/087733
§ 371 (c)(1),
(2) Date: Oct. 28, 2022

(87) PCT Pub. No.: WO2021/217483
PCT Pub. Date: Nov. 4, 2021

(65) Prior Publication Data
US 2023/0171759 A1   Jun. 1, 2023

(51) Int. Cl.
*H04W 72/12* (2023.01)
*H04L 1/08* (2006.01)

(52) U.S. Cl.
CPC ............ *H04W 72/12* (2013.01); *H04L 1/08* (2013.01)

(58) Field of Classification Search
CPC .................. H04W 72/12; H04L 1/08
(Continued)

(56) References Cited

U.S. PATENT DOCUMENTS

2002/0064167 A1* 5/2002 Khan ............... H04L 1/1845
370/522
2014/0362832 A1* 12/2014 Rudolf .............. H04L 1/1822
370/336
(Continued)

FOREIGN PATENT DOCUMENTS

CN          102201859 A      9/2011
CN          102739376 A     10/2012
(Continued)

OTHER PUBLICATIONS

International Search Report with English translation Issued Jan. 27, 2021, in PCT/CN2020/087733, filed on Apr. 29, 2020, 4 pages.
(Continued)

*Primary Examiner* — Chi Tang P Cheng
(74) *Attorney, Agent, or Firm* — Oblon, McClelland, Maier & Neustadt, L.L.P.

(57) ABSTRACT

Embodiments of the present application provide a data transmission scheduling method and apparatus, a communication device, and a storage medium. The method can include transmitting a first scheduling instruction to a User Equipment (UE) in a N-th time domain unit, where the first scheduling instruction schedules the UE to transmit uplink data in a (N+K)-th time domain unit, and the N and the K are both natural numbers, and transmitting, between the N-th time domain unit and the (N+K)-th time domain unit, at least one second scheduling instruction to the UE, where the second scheduling instruction schedules the UE to transmit uplink data.

15 Claims, 5 Drawing Sheets

(58) Field of Classification Search
USPC .................................................. 370/329
See application file for complete search history.

(56) References Cited

U.S. PATENT DOCUMENTS

| | | |
|---|---|---|
| 2018/0367263 A1 | 12/2018 | Ying et al. |
| 2019/0053227 A1 | 2/2019 | Huang et al. |

FOREIGN PATENT DOCUMENTS

| | | |
|---|---|---|
| CN | 104303578 A | 1/2015 |
| CN | 107241810 A | 10/2017 |
| CN | 108271162 A | 7/2018 |
| CN | 108633041 A | 10/2018 |
| CN | 109005007 A | 12/2018 |
| CN | 109152053 A | 1/2019 |
| CN | 109155702 A | 1/2019 |
| CN | 109219135 A | 1/2019 |
| CN | 109392160 A | 2/2019 |
| CN | 110959300 A | 4/2020 |
| WO | WO 2019/137432 A1 | 7/2019 |
| WO | WO 2020/019296 A1 | 1/2020 |

OTHER PUBLICATIONS

ETRI, "Multiplexing eMBB and URLLC UL control channels", 3GPP TSG RAN WG1 NR Ad Hoc Meeting RI-1702351, Athens Greece Feb. 13-17, 2017, 3 pages.

Chinese Office Action issued Nov. 22, 2023, in corresponding Chinese Patent Application No. 202080000859.6 (with English Translation), 14 pages.

Chinese Rejection of decision issued Jan. 31, 2024, in corresponding Chinese Patent Application No. 202080000859.6 (with English Translation), 14 pages.

Chinese Office Action issued Aug. 26, 2024, in corresponding Chinese Patent Application No. 202080000859.6 (with English Translation), 15 pages.

NTT DoComo, Fujitsu, Mitsubishi Electric, NEC, Sharp, Toshiba Corporation, "Frequency Domain Channel-Dependent Scheduling with Adaptive Transmission Bandwidth of Pilot Channel for CQI Measurement for E-UTRA Uplink", R1-060787, 3GPP TSG-RAN WG1 Meeting #44bis, Athens, Greece, Mar. 21, 2006, 10 pages.

Li Gui-Bin et al, "A HARQ scheme based on two users' cooperation", Journal of the Graduate School of the Chinese Academy of Sciences, vol. 26, No. 4, Jul. 2009, 7 pages. (with English Abstract).

English translation of Written Opinion issued Jan. 27, 2021 in PCT/CN2020/087733, 4 pages.

Combined Chinese Office Action and Search Report issued Nov. 3, 2022 in Patent Application No. 202080000859.6 (with English machine translation and English translation of Category of Cited Documents), 14 pages.

Combined Chinese Office Action and Search Report issued Jul. 13, 2023, in corresponding Chinese Patent Application No. 202080000859.6 (with English Translation and English Translation of Category of Cited Documents), 17 pages.

* cited by examiner

DATA TRANSMISSION SCHEDULING METHOD AND APPARATUS, COMMUNICATION DEVICE AND STORAGE MEDIUM

CROSS-REFERENCE TO RELATED APPLICATIONS

The present application is the U.S. national phase of PCT Application No. PCT/CN2020/087733 filed on Apr. 29, 2020, which is incorporated herein by reference in its entirety.

BACKGROUND OF THE INVENTION

Field of the Invention

The present application relates to a communication technology field, and in particular relates to data transmission scheduling methods and apparatuses, communication devices and storage media.

Description of the Related Art

In related technologies, coverage is one of key factors that operators consider when commercializing cellular networks. Compared with the Long Term Evolution (LTE), the New Radio (NR) may operate at much higher frequencies, such as 28 GHz or 39 GHz for Frequency Range 2 (FR2). At higher frequencies, wireless channels may suffer from higher path loss, which makes it more challenging to maintain coverage quality and service quality at least equivalent to that of the current cell, while a control channel is the main bottleneck for coverage.

For the bottleneck for coverage, repeated transmission in the time domain is generally used to obtain a combined gain. For uplink transmission, a base station may not feed back information about an Acknowledgement (ACK) character or a Negative Acknowledgement (NACK) character to a User Equipment (UE), but may directly tell whether the UE is to perform data retransmission through an instruction indicating old or new data in scheduling signaling. Therefore, it is necessary to go through a process based on transmitting a data packet, waiting for a scheduling instruction, and retransmitting the data packet.

SUMMARY OF THE INVENTION

Embodiments of the present disclosure disclose a data transmission scheduling method and apparatus, a communication device, and a storage medium.

According to a first aspect of the embodiments of the present disclosure, a data transmission scheduling method is provided, which can be applied to a base station and include transmitting a first scheduling instruction to a User Equipment (UE) in a N-th time domain unit, where the first scheduling instruction schedules the UE to transmit uplink data in a (N+K)-th time domain unit, and the N and the K are both natural numbers; and transmitting, between the N-th time domain unit and the (N+K)-th time domain unit, at least one second scheduling instruction to the UE, where the second scheduling instruction schedules the UE to transmit uplink data.

According to a second aspect of the embodiments of the present disclosure, a data transmission scheduling method is provided, which can be applied to a User Equipment (UE) and include receiving a first scheduling instruction transmitted by a base station in a N-th time domain unit, transmitting uplink data in a (N+K)-th time domain unit based on the first scheduling instruction, where the N and the K are both natural numbers, receiving a second scheduling instruction transmitted by the base station between the N-th time domain unit and the (N+K)-th time domain unit, and transmitting uplink data based on the second scheduling instruction.

According to a third aspect of the embodiments of the present disclosure, a data transmission scheduling apparatus is provided, which can be applied to a base station and include a first transmitting unit, configured to transmit a first scheduling instruction to a User Equipment (UE) in a N-th time domain unit, where the first scheduling instruction schedules the UE to transmit uplink data in a (N+K)-th time domain unit, and the N and the K are both natural numbers, and the first transmitting unit is further configured to transmit, between the N-th time domain unit and the (N+K)-th time domain unit, at least one second scheduling instruction to the UE, where the second scheduling instruction schedules the UE to transmit uplink data.

According to a fourth aspect of the embodiments of the present disclosure, a data transmission scheduling apparatus is provided, which can be applied to a User Equipment (UE) and include a second receiving unit, configured to receive a first scheduling instruction transmitted by a base station in a N-th time domain unit, a second transmitting unit, configured to transmit uplink data in a (N+K)-th time domain unit based on the first scheduling instruction, where the N and the K are both natural numbers, the second receiving unit is further configured to receive a second scheduling instruction transmitted by the base station between the N-th time domain unit and the (N+K)-th time domain unit; and the second transmitting unit is further configured to transmit uplink data based on the second scheduling instruction.

According to a fifth aspect of the embodiments of the present disclosure, a communication device is provided and the communication device may include a processor, a memory for storing instructions executable by the processor, where the processor is configured to perform the data transmission scheduling method according to any one of embodiments of the present disclosure when running the executable instructions.

According to a sixth aspect of the embodiments of the present disclosure, a non-transitory computer readable storage medium is provided. The storage medium stores a computer executable program, when the computer executable program is executed by a processor, the data transmission scheduling method according to any one of embodiments of the present disclosure is implemented.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE PREFERRED EMBODIMENTS

Embodiments will be described in detail herein, with the illustrations thereof represented in the drawings. When the following descriptions refer to the drawings, like numerals in different drawings refer to like or similar elements unless otherwise indicated. The examples described in the following embodiments do not represent all examples consistent with embodiments of the present disclosure. Rather, they are merely examples of apparatuses and methods consistent with some aspects of the present disclosure as detailed in the appended claims.

The terms used in the embodiments of the present disclosure are for the purpose of describing particular embodiments only, and are not intended to limit the embodiments of the present disclosure. Terms determined by "a", "the" and "said" in their singular forms in the embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like may be used in the embodiments of the present disclosure to describe various information, such information should not be limited to these terms. These terms are only used to distinguish one category of information from another. For example, without departing from the scope of the embodiments of the present disclosure, first information may be referred as second information; and similarly, the second information may also be referred as the first information. Depending on the context, the term "if" as used herein may be interpreted as "when" or "upon" or "in response to determining".

Figure 1:
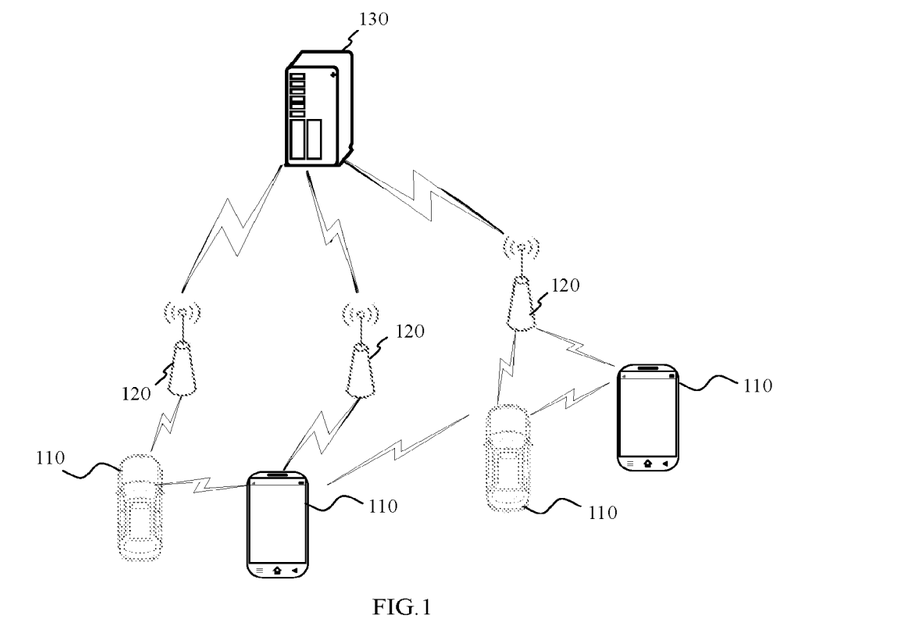
FIG. 1 is a structural schematic diagram illustrating a wireless communication system.

FIG. 1 is a structural schematic diagram illustrating a wireless communication system according to an example of the present disclosure. As shown in FIG. 1, the wireless communication system is a communication system based on cellular mobile communication technology. The wireless communication system may include several user equipment 110 and several base stations 120.

The user equipment 110 may be referred to as a device providing voice and/or data connectivity to a user. The user equipment 110 may communicate with one or more core networks through a Radio Access Network (RAN). The user equipment 110 may include a terminal in Internet of Things, such as a sensor device, a mobile phone (or called a cellular phone), and a computer having a terminal of Internet of Things, such as a fixed, portable, pocket-size, handheld, or computer-inbuilt or vehicle-mounted apparatus. The user equipment 110 may also include, for example, a STAtion (STA), a subscriber unit, a subscriber station, a mobile station, a mobile, a remote station, an access point, a remote terminal, an access terminal, a user terminal, a user agent, a user device, or a user equipment. Optionally, the user equipment 110 may also include a device carried on an unmanned aerial vehicle, or a vehicle-mounted device, for example, a trip computer having wireless communication function, or a wireless communication device externally connected to a trip computer. Optionally, the user equipment 110 may be a roadside device, for example, may be a road lamp, a signal lamp or other roadside devices having wireless communication function.

The base station 120 may include a network side device in the wireless communication system. The wireless communication system may be the 4th-generation mobile communication technology (4G) system, which is also called the Long Term Evolution (LTE) system. Optionally, the wireless communication system may also include the 5G system, which is also called the New Radio (NR) system or the 5G NR system. Optionally, the wireless communication system may also include a next generation system of the 5G system. An access network in the 5G system may be referred to as New Generation-Radio Access Network (NG-RAN).

The base station 120 may include an evolved Node B (eNB) base station employed in the 4G system. Optionally, the base station 120 may also include a base station (gNB) adopting a centralized-distributed architecture in the 5G system. When adopting the centralized distributed architecture, the base station 120 usually includes a Central Unit (CU) and at least two Distributed Units (DUs). In the Central Unit, protocol stacks of a Packet Data Convergence Protocol (PDCP) layer, a Radio Link Control (RLC) layer and a Media Access Control (MAC) layer are disposed; and in Distributed Unit(s), a Physical (PHY) layer protocol stack is disposed. Specific implementations of the base station 120 are not limited in the examples of the present disclosure.

Wireless connection between the base station 120 and the user equipment 110 may be established through an air interface. In different implementations, the air interface is an air interface based on the 4th-generation mobile communication network technology (4G) standards; or the air interface is an air interface based on the fifth generation mobile communication network technology (5G) standards, for example, the air interface is New Radio; or the air interface may also be an air interface based on standards of a next generation mobile communication network technology of 5G.

In some embodiments, End to End (E2E) connection may further be established between the user equipment 110, for example, in the scenarios of Vehicle to Vehicle (V2V) communication, Vehicle to Infrastructure (V2I) communication, and Vehicle to Pedestrian (V2P) communication and the like in Vehicle to everything (V2X) communication.

The above-mentioned user equipment may be considered as the user equipment in the following embodiments. In some examples, the above wireless communication system may further include a network management device 130.

Several base stations 120 are connected to the network management device 130 respectively. The network management device 130 may include a core network device in the wireless communication system, for example, the network management device 13 may include a Mobility Management Entity (MME) in an Evolved Packet Core (EPC). Alternatively, the network management device may also include other core network devices, such as a Serving GateWay (SGW), a Public Data Network GateWay (PGW), Policy and Charging Rules Function (PCRF), or a Home Subscriber Server (HSS), and the like. The implementation morphology of the network management device 130 is not limited in the examples of the present disclosure.

In a communication system, due to time-varying characteristics of wireless channels and influence of multipath fading on signal transmission, as well as some unpredictable interference, signal transmission may fail. Generally, Forward Error Correction (FEC), Automatic Repeat-reQuest (ARQ) and other technologies can be used to perform error control, so as to ensure the service quality. In the FEC technology, a certain check bits can be added to information bit(s), thereby reducing the coding efficiency and realizing correct reception at a receiver. In the ARQ technology, a receiver can determine correctness of a received data packet by using Cyclic Redundancy Check (CRC) information. In most wireless retransmission systems, both the ARQ and the FEC are used to form a Hybrid Automatic Repeat request (HARQ) mechanism.

Generally, there are three basic HARQ retransmission mechanisms in data communication, namely a Stop-and-Wait mechanism, a Go-Back-N mechanism, and a Selective Repeat mechanism.

In the Stop-and-Wait, each time a transmitter transmits a data packet, the transmitter can temporarily stop and wait for an ACK from a receiver. When the data packet reaches the receiver, the receiver can perform error checking on the data packet. In a case that the data packet is received correctly, an ACK signal can be transmitted back. In a case that the data packet is received incorrectly, a NACK can be transmitted back. When the transmitter receives an ACK, the transmitter can transmit a new data packet, otherwise the transmitter can retransmit the previously sent data packet. While waiting for an ACK, channel(s) is idle and no data is transmitted.

In the Go-Back-N mechanism, when a transmitter continuously transmits data packets, the transmitter can go back N steps. A transmitter and a receiver respectively have a transmitting and receiving window of size N, through which a system can transmit and receive data continuously. In this way, the Go-Back-N mechanism does not need to transmit a new data packet after receiving an ACK like the Stop-and-Wait mechanism. In the Go-Back-N mechanism, in a case that a receiver finds an incorrect data packet, the receiver can transmit a retransmission request. In this way, a transmitter can retransmit both a data packet requested for retransmission and data packet(s) currently being transmitted in the transmitting window. In the Go-Back-N mechanism, when a data packet is wrongly received, a plurality of data packets are to be retransmitted, which wastes resources and is inefficient.

In the Selective Repeat mechanism, only data packets with errors are retransmitted. However, in the Selective Repeat mechanism, a receiver may receive data packets not in sequence, so the receiver needs a cache space with a considerable capacity to store groups that have been successfully decoded but not yet output in sequence. At the same time, the receiver needs to know a sequence number before combining data packet(s), so the sequence number is encoded separately with the data packet. The sequence number is expected to be encoded more reliably to overcome an error that appears in data packet(s) at any time. As such, the Selective Repeat mechanism would increase needs for signaling.

The Stop-and-Wait mechanism is not only simple and reliable, but also has low system signaling overhead and reduces the needs for the receiver's cache space. However, the signal utilization rate of the Stop-and-Wait mechanism is low. As such, an improved N-channel Stop-and-Wait mechanism can be used for HARQ transmission in an NR system. That is, a transmitter can run N different stop-and-wait processes in parallel with a channel, and can use gaps among different processes to transmit data or signaling alternately, thereby improving the utilization rate of channels. In this way, in a process of waiting for feedback information from a certain HARQ process, other idle processes can be used to transmit data packets. A maximum number of uplink or downlink processes allowed in NR Release 15 (R15) can be stipulated to be 16. A base station can semi-statically configure the maximum number of processes supported by a UE through high-layer signaling. In a case that a network does not provide corresponding configuration parameters, the default number of HARQ processes for downlink can be 8, and the maximum number of HARQ processes supported for uplink can be 16. A HARQ process ID (Identifier) can be carried through a Physical Downlink Control CHannel (PDCCH) and can be fixed to 4 bits.

In the NR system, to reduce the complexity of terminal implementation, NR R15 only supports sequential HARQ scheduling, that is, a HARQ-ACK related to data scheduled later will not be fed back before a HARQ-ACK related to data scheduled earlier, which is used both for uplink and downlink. Meanwhile, for the same HARQ ID, in a case that the HARQ-ACK related to the data scheduled first is not fed back, the same data is not scheduled again.

For the coverage bottleneck, repeated transmission in the time domain is generally used to obtain a combined gain. In the existing protocol, while a UE is transmitting a data packet after receiving a scheduling instruction, a base station would not issue another scheduling instruction until receiving the data packet. Therefore, a period for waiting may exist in the scheduling process, which leads to an increase in transmission delay.

Based on this, embodiments of the present disclosure provide data transmission scheduling methods to at least alleviate the above problem.

Figure 2:
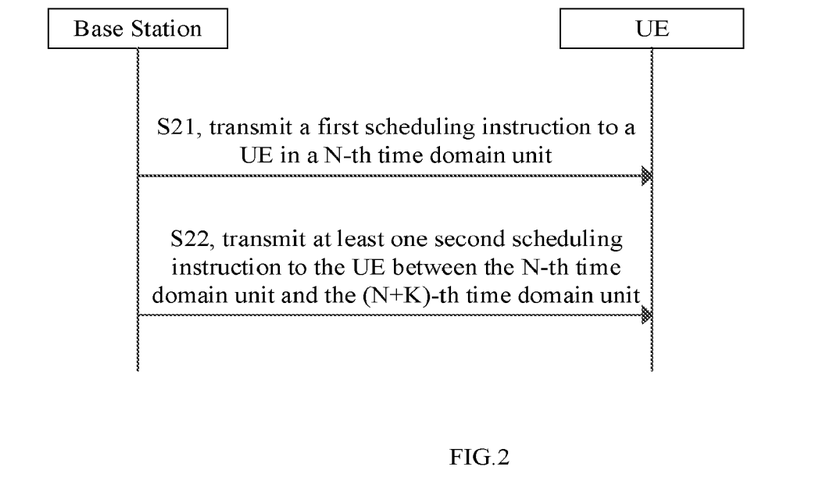
FIG. 2 is a flowchart illustrating a data transmission scheduling method according to an example embodiment.

As shown in FIG. 2, the present embodiment provides a data transmission scheduling method, which can be applied to a base station and the method may include the following.

At step S21, a first scheduling instruction is transmitted to a User Equipment (UE) in a N-th time domain unit. The first scheduling instruction schedules the UE to transmit uplink data in a (N+K)-th time domain unit, where the N and the K are both natural numbers.

At step S22, at least one second scheduling instruction is transmitted to the UE between the N-th time domain unit and the (N+K)-th time domain unit.

The second scheduling instruction schedules the UE to transmit uplink data.

The base station may be an interface device for the UE to access the Internet. The base station may be various types of base stations, for example, a 3G base station, a 4G base station, a 5G base station, or other evolved base stations. The UE may be a mobile phone, a computer, a server, a transceiver device, a tablet device, or a medical device and so on. In one embodiment, the K is a positive integer.

In some embodiments, the second scheduling instruction is used to schedule new transmission data or retransmission data. The second scheduling instruction can be an instruction issued after the first scheduling instruction, and used to schedule any one of the new transmission data or the retransmission data.

In one embodiment, the retransmission data is data associated with retransmitting the original uplink data scheduled by the first scheduling instruction. In this way, in the embodiments of the present disclosure, the base station may transmit, within a time period of waiting for uplink data transmitted based on the first scheduling instruction, a scheduling instruction for rescheduling the uplink data, or may also transmit a scheduling instruction for scheduling new transmission data.

The at least one second scheduling instruction may include one or more second scheduling instructions. In a case that at least one second scheduling instruction includes a plurality of second scheduling instructions, the plurality of second scheduling instructions may all be used to schedule new transmission data, or may all be used to schedule retransmission data. Alternately, some of the second scheduling instructions may be used to schedule new transmission data, and some of the second scheduling instructions may be used to schedule retransmission data.

In a case that at least two of the plurality of second scheduling instructions are used to schedule new transmission data, the new transmission data, scheduled by the at least two second scheduling instructions respectively, can be different.

For example, in one embodiment, the step S22 may include that, between the N-th time domain unit and the (N+K)-th time domain unit, at least one second scheduling instruction is transmitted to the UE, where the second scheduling instruction can be used to schedule new transmission data.

For another example, in one embodiment, the step S22 may include that, between the N-th time domain unit and the (N+K)-th time domain unit, a plurality of second scheduling instructions are transmitted to the UE, where some of the second scheduling instructions can be used to schedule new transmission data, and some of the second scheduling instructions can be used to schedule retransmission data.

For another example, in one embodiment, the step S22 may include that, between the N-th time domain unit and the (N+K)-th time domain unit, two second scheduling instructions are transmitted to the UE. One of the second scheduling instructions can be used to schedule retransmission data, and the other one of the second scheduling instructions can be used to schedule new transmission data. A time domain unit in which the second scheduling instruction for scheduling the retransmission data is transmitted can be earlier than a time domain unit in which the second scheduling instruction for scheduling the new transmission data is transmitted.

In this way, in the present embodiment, it can be ensured as much as possible that the new transmission data can be transmitted when the retransmission data has been transmitted.

For another example, in one embodiment, S22 may include that, between the N-th time domain unit and the (N+K)-th time domain unit, at least one second scheduling instruction is transmitted to the UE, where the second scheduling instruction can be used to schedule retransmission data.

For another example, in one embodiment, the step S22 may include that, between the N-th time domain unit and the (N+K)-th time domain unit, three second scheduling instructions are transmitted to the UE. The first second scheduling instruction can be used to schedule retransmission data, the second of the second scheduling instruction can be used to schedule first new transmission data, and the third second scheduling instruction can be used to schedule second new transmission data.

In this way, in the present embodiment, during a time period of waiting for uplink data transmitted based on the first scheduling instruction, the base station can not only reschedule the uplink data transmitted based on the first scheduling instruction, but also schedule a quantity of new transmission data.

In some embodiments, step S21 may include transmitting the first scheduling instruction to the UE through a Physical Downlink Control CHannel (PDCCH), and/or step S22 may include transmitting the at least one second scheduling instruction to the UE through the PDCCH.

In one embodiment, a time domain unit may include a slot or a symbol. In another embodiment, a time domain unit may include a mini slot. In one embodiment, a slot may include 14 symbols. In one embodiment, a slot may indicate 1 millisecond. In other embodiments, time of a slot may be of other time length, for example, a slot may indicate 9 microseconds.

In other embodiments, the time domain unit may be any other time unit, for example, a time domain unit may be 1 millisecond, 0.1 millisecond, 0.2 millisecond, 1 microsecond, 10 microseconds and the like. In the present embodiment, time included in one time domain unit is not limited. In this way, in the embodiments of the present disclosure, when the first scheduling instruction is transmitted in the N-th time domain unit, the base station can transmit the second scheduling instruction prior to receiving the uplink data scheduled based on the first scheduling instruction in the (N+K)-th time domain unit, without waiting to transmit the second scheduling instruction when the uplink data scheduled based on the scheduling instruction is already received. Therefore, the second scheduling instruction can be transmitted during the time period of waiting for receiving the uplink data, thereby reducing the time delay of the entire scheduling process and improving the scheduling efficiency.

In addition, because the second scheduling instruction can be issued while waiting to receive the uplink data transmitted by the UE based on the first scheduling instruction, the utilization rate of a channel can be improved as well.

In some embodiments, at least one bit of the second scheduling instruction indicates scheduling new transmission data or retransmission data.

For example, in one embodiment, a bit in a second scheduling instruction with a value "0" can be used to indicate scheduling retransmission data, and the bit in a second scheduling instruction with a value "1" can be used to indicate scheduling new transmission data.

For another example, in one embodiment, two bits in a second scheduling instruction with a value "00" can be used to indicate scheduling retransmission data, and the two bits in a second scheduling instruction with a value "01" can be used to indicate scheduling new transmission data.

In this way, in the embodiments of the present disclosure, through at least one bit of the second scheduling instruction, the UE can be informed of whether the second scheduling instruction is used to retransmit data or transmit new data.

In one embodiment, transmitting a second scheduling instruction to the UE may include transmitting Downlink Control Information (DCI) carrying the second scheduling instruction to the UE, where at least one bit of the second scheduling instruction can be used to indicate scheduling new transmission data or retransmission data.

In this way, in the embodiments of the present disclosure, the scheduling instruction can be issued through one piece of DCI, so that the compatibility of the DCI can be improved.

Figure 3:
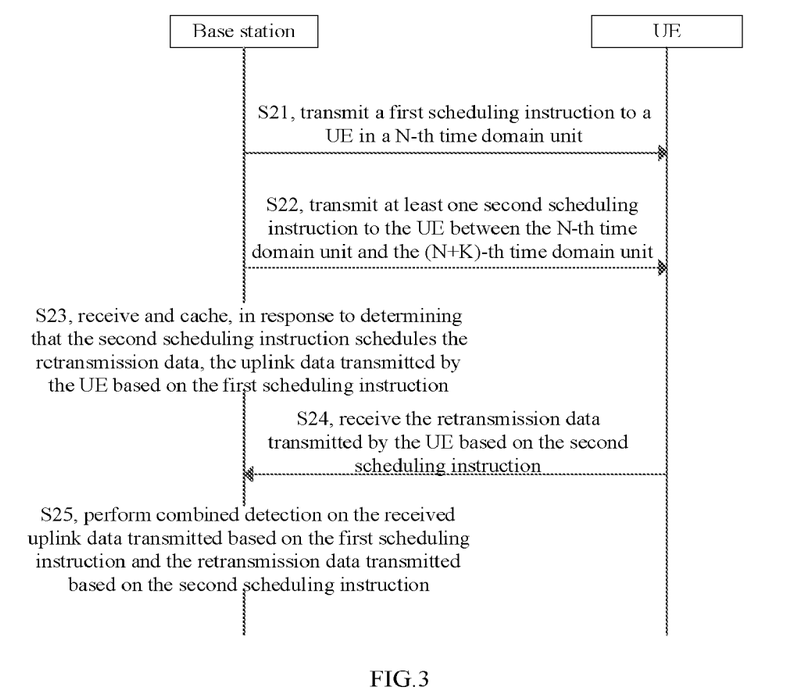
FIG. 3 is a flowchart illustrating a data transmission scheduling method according to an example embodiment.

As shown in FIG. 3, in some embodiments, the method may further include the following.

At step S23, in response to determining that the second scheduling instruction schedules the retransmission data, the uplink data transmitted by the UE based on the first scheduling instruction is received and cached.

In one embodiment, receiving the uplink data transmitted by the UE based on the first scheduling instruction may include receiving, through a Physical Uplink Shared CHannel (PUSCH), the uplink data transmitted by the UE based on the first scheduling instruction.

In the step S23, the received uplink data transmitted by the UE based on the first scheduling instruction may include: uplink data received in the (N+K)-th time domain unit or after the (N+K)-th time domain unit, and transmitted based on the first scheduling instruction.

In the embodiments of the present disclosure, in a case that the second scheduling instruction is a scheduling instruction for scheduling retransmission data, the received uplink data transmitted based on the first scheduling instruction can be cached, which is beneficial for the base station to combine this received uplink data and uplink data transmitted by the UE based on the second scheduling instruction subsequently.

In some embodiments, the method may further include the following. At step S24, the retransmission data transmitted by the UE based on the second scheduling instruction is received. At step S25, combined detection is performed on the received uplink data transmitted based on the first scheduling instruction and the retransmission data transmitted based on the second scheduling instruction.

For example, a way to realize the step S25 can include deleting a duplicate part between the uplink data transmitted based on the first scheduling instruction and the retransmission data transmitted based on the second scheduling instruction, and combining the uplink data and the retransmission data without the deleted duplicate part.

In the embodiments of the present disclosure, the base station can perform combined detection on the received uplink data transmitted based on the first scheduling instruction and the retransmission data transmitted based on the second scheduling instruction. In this way, complete uplink data transmitted based on the first scheduling instruction can be further obtained, thereby improving the accuracy of receiving the uplink data.

In the embodiments of the present disclosure, the base station may perform combined decoding based on the cached uplink data and the uplink data reported based on the second scheduling instruction, thereby ensuring the decoding accuracy of the uplink data.

It should be pointed out here that the following data transmission scheduling method can be applied to a User Equipment (UE), for which description can be similar to the description of the above-mentioned data transmission scheduling method applied to the base station. In the present disclosure, for technical details that are not disclosed in the embodiments of the data transmission scheduling method applied to the UE, please refer to the description of the data transmission scheduling method embodiments applied to the base station, which will not be described in detail here.

Figure 4:
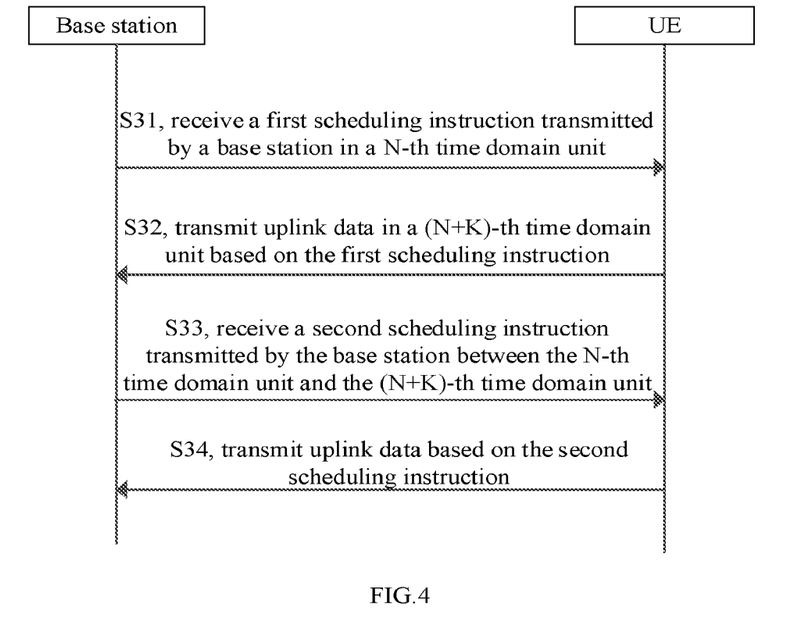
FIG. 4 is a flowchart illustrating a data transmission scheduling method according to an example embodiment.

As shown in FIG. 4, a data transmission scheduling method is provided, which can be applied to the UE and may include the following.

At step S31, a first scheduling instruction transmitted by a base station in a N-th time domain unit is received. At step S32, uplink data is transmitted in a (N+K)-th time domain unit based on the first scheduling instruction. Both the N and the K are natural numbers.

At step S33, a second scheduling instruction transmitted by the base station between the N-th time domain unit and the (N+K)-th time domain unit is received.

At step S34, uplink data is transmitted based on the second scheduling instruction.

In some embodiments, the step S34 may include transmitting new transmission data or retransmission data based on the second scheduling instruction.

In some embodiments, at least one bit of the second scheduling instruction indicates scheduling the new transmission data or the retransmission data.

In some embodiments, the step S34 may include, in response to determining that the second scheduling instruction schedules the new transmission data, transmitting the new transmission data.

In some embodiments, the step S34 may include, in response to determining that the second scheduling instruction schedules the retransmission data, transmitting the retransmission data.

In some embodiments, the step S31 may include receiving, through a Physical Downlink Control CHannel (PDCCH), the first scheduling instruction transmitted by the base station and/or the step S33 may include receiving, through the PDCCH, the second scheduling instruction transmitted by the base station.

In some embodiments, the step S32 may include transmitting, through a Physical Uplink Shared CHannel (PUSCH), the uplink data in the (N+K)-th time domain unit based on the first scheduling instruction, and/or the step S34 may include transmitting, through the PUSCH, the uplink data based on the second scheduling instruction.

In some embodiments, a time domain unit may include a slot or a symbol.

To help understand the above-mentioned embodiments of the present disclosure, the following examples are used here for description.

EXAMPLE 1

Figure 5:
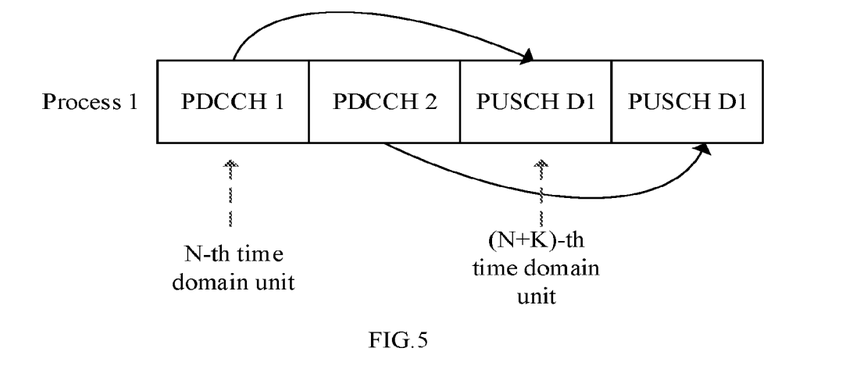
FIG. 5 is a flowchart illustrating a data transmission scheduling method according to an example embodiment.

In an application scenario, as shown in FIG. 5, a User Equipment (UE) may need to transmit a first data packet D1 and also retransmit the D1 in process 1 (corresponding to one HARQ ID).

Figure 6:
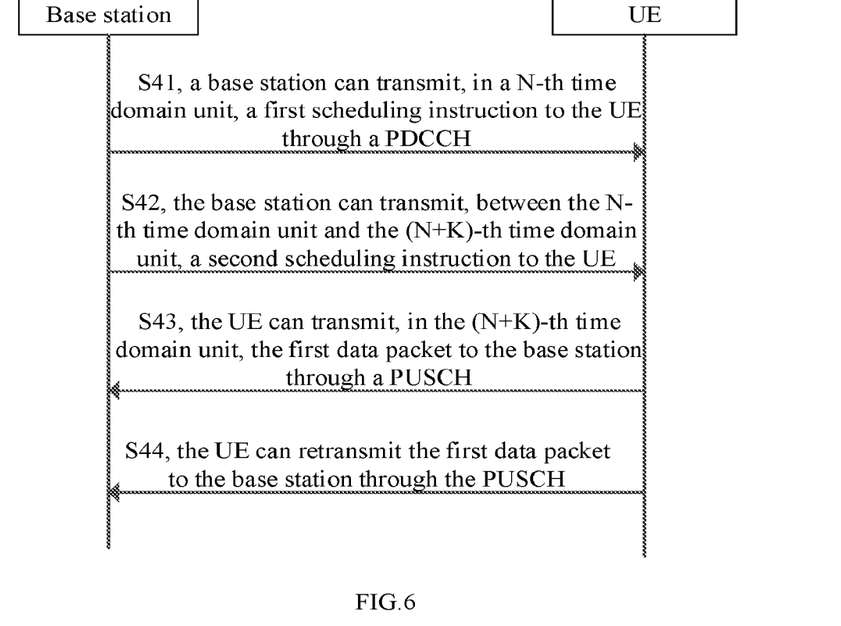
FIG. 6 is a flowchart illustrating a data transmission scheduling method according to an example embodiment.

As shown in FIG. 6, the embodiments of the present disclosure provide a data transmission scheduling method, and the method may include the following steps.

At step S41, a base station can transmit, in a N-th time domain unit, a first scheduling instruction to the UE through a PDCCH.

The first scheduling instruction can be used to schedule the UE to transmit a first data packet (e.g., D1) in a (N+K)-th time domain unit.

Here, in FIG. 5, "PDCCH 1" can be used to represent transmitting the first scheduling instruction through the PDCCH, and "D1" can be used to represent the first data packet.

At step S42, the base station can transmit, between the N-th time domain unit and the (N+K)-th time domain unit, a second scheduling instruction to the UE.

The second scheduling instruction can be used to schedule the UE to retransmit the first data packet (e.g., D1).

At least one bit of the second scheduling instruction can be used to indicate retransmitting the first data packet.

In FIG. 5, "PDCCH 2" can be used to represent transmitting the second scheduling instruction through the PDCCH.

At step S43, the UE can transmit, in the (N+K)-th time domain unit, the first data packet to the base station through a PUSCH.

In FIG. 5, "PUSCH D1" can be used to represent transmitting the first data packet (e.g., D1) through the PUSCH.

At step S44, the UE can retransmit the first data packet to the base station through the PUSCH.

The step S44 can be the step of retransmitting data in the above-mentioned embodiments. In step S44, the time domain unit in which the first data packet is retransmitted to the base station may be any time domain unit after the (N+K)-th time domain unit.

In an optional embodiment, the time domain unit in which the first data packet is retransmitted to the base station can be the K-th time domain unit after transmitting the second scheduling instruction.

In the embodiments of the present disclosure, during time after the base station transmitting the first scheduling instruction and before the UE transmitting the first data packet based on the first scheduling instruction, the base station can transmit a second scheduling instruction for rescheduling the first data packet. In this way, the base station does not need to wait until the first data packet is received before transmitting the second scheduling instruction for rescheduling the first data packet. Therefore, the time of waiting to transmit the second scheduling instruction can be saved, and the time delay of the scheduling process can be reduced. In addition, the utilization rate of the PDCCH and/or PUSCH can be improved as well.

EXAMPLE 2

Figure 7:
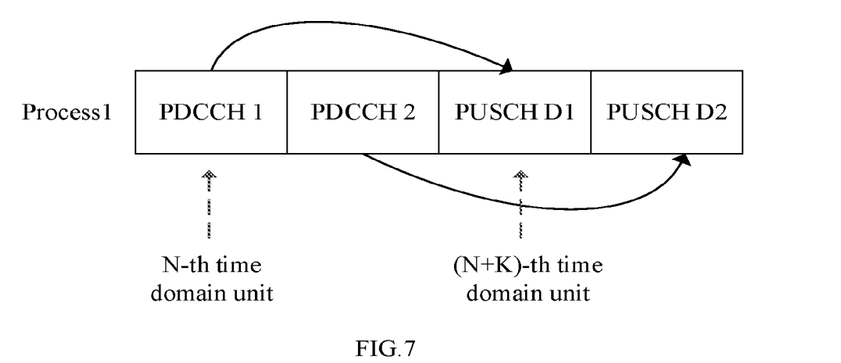
FIG. 7 is a flowchart illustrating a data transmission scheduling method according to an example embodiment.

In an application scenario, as shown in FIG. 7, a User Equipment (UE) may need to transmit a first data packet D1 and also newly transmit a second data packet D2 in process 1 (corresponding to one HARQ ID).

Figure 8:
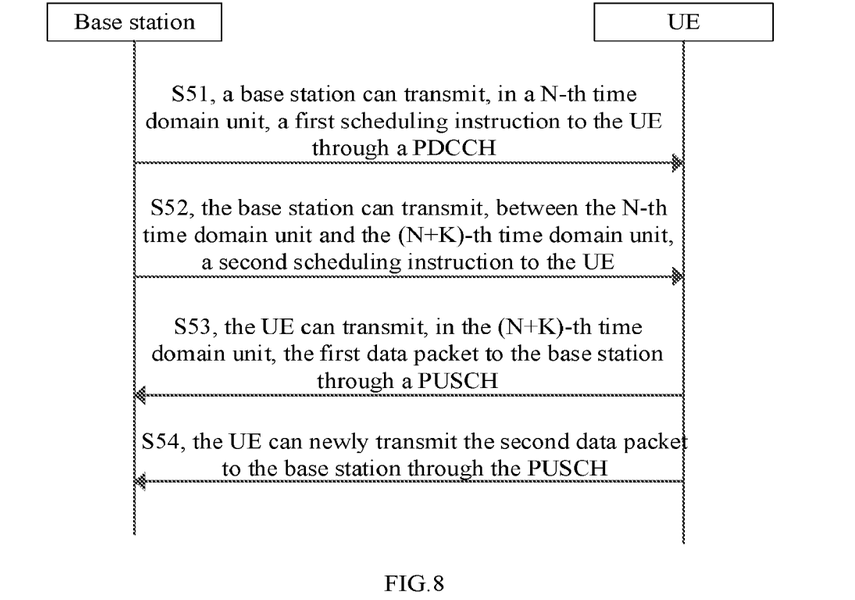
FIG. 8 is a flowchart illustrating a data transmission scheduling method according to an example embodiment.

As shown in FIG. 8, the embodiments of the present disclosure provide a data transmission scheduling method, and the method may include the following steps.

At step S51, a base station can transmit, in a N-th time domain unit, a first scheduling instruction to the UE through a PDCCH. The first scheduling instruction can be used to schedule the UE to transmit a first data packet (e.g., D1) in a (N+K)-th time domain unit.

In FIG. 7, "PDCCH 1" can be used to represent transmitting the first scheduling instruction through the PDCCH, "D1" can be used to represent the first data packet, and "D2" can be used to represent a second data packet.

At step S52, the base station can transmit, between the N-th time domain unit and the (N+K)-th time domain unit, a second scheduling instruction to the UE. The second scheduling instruction can be used to schedule the UE to newly transmit a second data packet (e.g., D2). At least one bit of the second scheduling instruction can be used to indicate newly transmitting the second data packet.

In FIG. 7, "PDCCH 2" can be used to represent transmitting the second scheduling instruction through the PDCCH. At step S53, the UE can transmit, in the (N+K)-th time domain unit, the first data packet to the base station through a PUSCH.

In FIG. 7, "PUSCH D1" can be used to represent transmitting the first data packet (e.g., D1) through the PUSCH, and "PUSCH D2" can be used to represent transmitting the second data packet through the PUSCH. At step S54, the UE can newly transmit the second data packet to the base station through the PUSCH. The step S54 can be the step of newly transmitting data in the above-mentioned embodiments. In step S54, the time domain unit in which the second data packet is newly transmitted to the base station may be any time domain unit after the (N+K)-th time domain unit.

In an optional embodiment, the time domain unit in which the second data packet is newly transmitted to the base station can be the K-th time domain unit after transmitting the second scheduling instruction.

In the embodiments of the present disclosure, during time after the base station transmitting the first scheduling instruction and before the UE transmitting the first data packet based on the first scheduling instruction, the base station can transmit a second scheduling instruction for scheduling the second data packet. Therefore, the base station does not need to wait until the first data packet is received before transmitting the second scheduling instruction for scheduling other data. In this way, during the waiting time when the first data packet is scheduled and not yet been received, the base station can transmit the second scheduling instruction for scheduling the second data packet, thereby saving the time of waiting to transmit the second scheduling instruction and reducing the time delay of the scheduling process. In addition, the utilization rate of the PDCCH and/or PUSCH can be improved as well.

Figure 9:
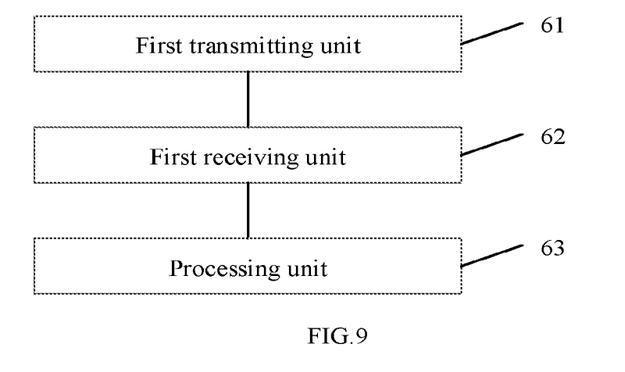
FIG. 9 is a block diagram illustrating a data transmission scheduling apparatus according to an example embodiment.

As shown in FIG. 9, the embodiments of the present disclosure provide a data transmission scheduling apparatus, which can be applied to a base station and include a first transmitting unit 61, configured to transmit a first scheduling instruction to a User Equipment (UE) in a N-th time domain unit, where the first scheduling instruction schedules the UE to transmit uplink data in a (N+K)-th time domain unit, and the N and the K are both natural numbers, and the first transmitting unit 61 is further configured to transmit, between the N-th time domain unit and the (N+K)-th time domain unit, at least one second scheduling instruction to the UE, where the second scheduling instruction schedules the UE to transmit uplink data.

In some embodiments, the second scheduling instruction schedules new transmission data or retransmission data.

In some embodiments, the apparatus further includes a first receiving unit 62, configured to receive and cache, in response to determining that the second scheduling instruction schedules the retransmission data, the uplink data transmitted by the UE based on the first scheduling instruction.

In some embodiments, the first receiving unit 62 is configured to receive the retransmission data transmitted by the UE based on the second scheduling instruction, and the apparatus further includes a processing unit 63, configured to perform combined detection on the received uplink data transmitted based on the first scheduling instruction and the retransmission data transmitted based on the second scheduling instruction.

In some embodiments, at least one bit of the second scheduling instruction indicates scheduling the new transmission data or the retransmission data.

In some embodiments, the first transmitting unit 61 is configured to transmit the first scheduling instruction to the UE through a Physical Downlink Control CHannel (PDCCH), and/or the first transmitting unit 61 is configured to transmit the at least one second scheduling instruction to the UE through the PDCCH.

In some embodiments, the first receiving unit 62 is configured to receive, through a Physical Uplink Shared CHannel (PUSCH), the uplink data transmitted by the UE based on the first scheduling instruction, and/or the first receiving unit 62 is configured to receive, through the PUSCH, the retransmission data transmitted by the UE based on the second scheduling instruction. In some embodiments, a time domain unit includes a slot or a symbol.

Figure 10:
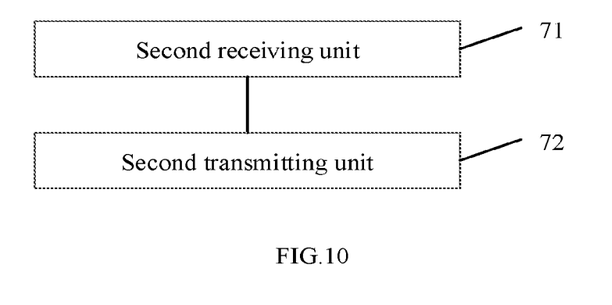
FIG. 10 is a block diagram illustrating a data transmission scheduling apparatus according to an example embodiment.

As shown in FIG. 10, the embodiments of the present disclosure provide a data transmission scheduling apparatus, which can be applied to a User Equipment (UE) and include a second receiving unit 71, configured to receive a first scheduling instruction transmitted by a base station in a N-th time domain unit, a second transmitting unit 72, configured to transmit uplink data in a (N+K)-th time domain unit based on the first scheduling instruction, where the N and the K are both natural numbers, the second receiving unit 71 is further configured to receive a second scheduling instruction transmitted by the base station between the N-th time domain unit and the (N+K)-th time domain unit, and the second transmitting unit 72 is further configured to transmit uplink data based on the second scheduling instruction.

In some embodiments, the second transmitting unit 72 is further configured to transmit new transmission data or retransmission data based on the second scheduling instruction.

In some embodiments, at least one bit of the second scheduling instruction indicates scheduling the new transmission data or the retransmission data.

In some embodiments, the second receiving unit 71 is configured to receive, through a Physical Downlink Control CHannel (PDCCH), the first scheduling instruction transmitted by the base station, and/or the second receiving unit 71 is configured to receive, through the PDCCH, the second scheduling instruction transmitted by the base station.

In some embodiments, the second transmitting unit 72 is configured to transmit, through a Physical Uplink Shared CHannel (PUSCH), the uplink data in the (N+K)-th time domain unit based on the first scheduling instruction, and/or the second transmitting unit 72 is configured to transmit, through the PUSCH, the uplink data based on the second scheduling instruction. In some embodiments, a time domain unit includes a slot or a symbol.

With regard to the device in the above examples, the specific manner in which the respective units perform the operations has been described in detail in the examples of the related methods, and will not be explained in detail herein.

The embodiments of the present disclosure provide a communication device and the communication device may include a processor and a memory for storing instructions executable by the processor. The processor is configured to perform the data transmission scheduling method according to any one of embodiments of the present disclosure when running the executable instructions. The communication device may include a base station or a user equipment.

The processor may include various types of storage media, and the storage media may be non-transitory computer storage media that can continue memorizing information stored thereon when the communication device is powered off. The processor can be connected with the memory through a bus etc., and can be used to read and run an executable program stored on the memory to implement, for example, at least one of methods shown in FIGS. 2 to 4, 6 and 8.

The embodiments of the present disclosure provide a non-transitory computer readable storage medium. The non-transitory computer readable storage medium stores a computer executable program, when the computer executable program is executed by a processor, the data transmission scheduling method according to any one of embodiments of the present disclosure is implemented. For example, at least one of methods shown in FIGS. 2 to 4, 6 and 8 can be implemented.

With regard to the apparatus in the above examples, a specific manner in which the respective units perform operations has been described in detail in the examples of the related methods, and will not be explained in detail herein.

Figure 11:
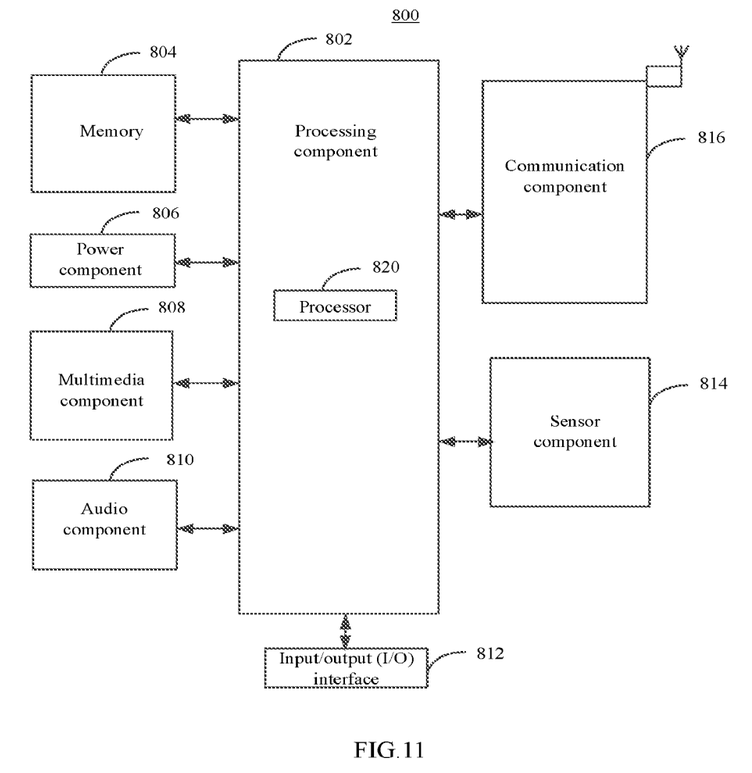
FIG. 11 is a block diagram illustrating a user equipment according to an example embodiment.

FIG. 11 is a schematic block diagram illustrating a User Equipment (UE) 800 according to an example of the present disclosure. For example, the UE 800 can be a mobile phone, a computer, a digital broadcast UE, a message transmitting and receiving device, a gaming console, a tablet device, a medical device, a fitness device, a personal digital assistant, and the like.

As shown in FIG. 11, the UE 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the UE 800, such as operations associated with display, phone calls, data communications, camera operations, and recording operations. Processing component 802 can include one or more processors 820 to execute instructions to perform all or part of the steps described above. In addition, the processing component 802 may include one or more modules which facilitate the interaction between the processing component 802 and other components. For example, processing component 802 can include a multimedia module to facilitate interaction between multimedia component 808 and processing component 802.

Memory 804 is configured to store various types of data to support operation at UE 800. Examples of such data include instructions for any application or method operated on the UE 800, contact data, phonebook data, messages, pictures, videos, and so on. The memory 804 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

Power component 806 provides power to various components of UE 800. Power component 806 can include a power management system, one or more power sources, and other components associated with generating, managing, and distributing power for UE 800.

The multimedia component 808 includes a screen between the UE 800 and the user that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 808 may include a front camera and/or a rear camera. When the UE 800 is in an operation mode, such as a shooting mode or a video mode, the front camera and/or the rear camera can receive external multimedia data. Each front and rear camera can be a fixed optical lens system or have focal length and optical zoom capabilities.

The audio component 810 may be configured to output and/or input an audio signal. For example, the audio component 810 may include a microphone (MIC) configured to receive an external audio signal when the UE 800 is in an operating mode, such as a call mode, a recording mode, and a voice recognition mode. The received audio signal may be further stored in the memory 804 or sent via the communication component 816. In some examples, the audio component 810 further includes a speaker to output an audio signal.

The I/O interface 812 provides an interface between the processing component 802 and peripheral interface modules. The above peripheral interface modules may be a keyboard, a click wheel, buttons, and so on. These buttons may include, but are not limited to, a home button, a volume button, a start button, and a lock button.

The sensor component 814 may include one or more sensors to provide status assessments of various aspects for the UE 800. For example, sensor component 814 can detect an open/closed state of UE 800, a relative positioning of components, such as the display and keypad of UE 800, and sensor component 814 can also detect a change in position of UE 800 or a component of UE 800, the presence or absence of user contact with UE 800, orientation or acceleration/deceleration of UE 800, and temperature change of UE 800. The sensor component 814 may include a proximity sensor configured to detect the presence of a nearby object without any physical contact. The sensor component 814 may further include an optical sensor, such as a CMOS or CCD image sensor which is used in imaging applications. In some examples, the sensor component 814 may further include an acceleration sensor, a gyroscope sensor, a magnetic sensor, a pressure sensor, or a temperature sensor.

The communication component 816 may be configured to facilitate wired or wireless communication between the UE 800 and other devices. The UE 800 can access a wireless network based on any communication standard, such as WiFi, 2G, 3G, 4G or 5G or a combination thereof. In an embodiment, communication component 816 receives broadcast signals or broadcast associated information from an external broadcast management system via a broadcast channel. In an embodiment, the communication component 816 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an embodiment, UE 800 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for performing the method described in any of the above examples.

In an embodiment, there is also provided a non-transitory computer readable storage medium including instructions, such as a memory 804 including instructions executable by processor 820 of UE 800 to perform the above method. For example, the non-transitory computer readable storage medium may be a ROM, a random access memory (RAM), a CD-ROM, a magnetic tape, a floppy disk, and an optical data storage device.

Figure 12:
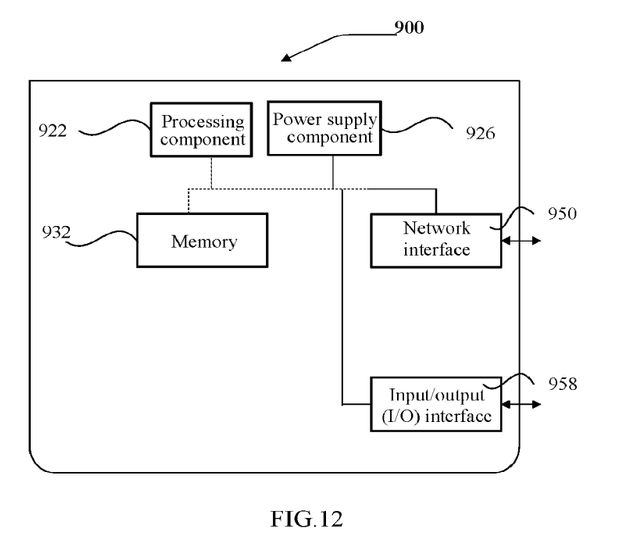
FIG. 12 is a block diagram illustrating a base station according to an example embodiment.

As shown in FIG. 12, an embodiment of the present disclosure shows a structure of a base station. For example, base station 900 may be provided as a network side device. Referring to FIG. 12, the base station 900 includes a processing component 922 and further includes one or more processors and memory resources represented by a memory 932 and used to store instructions executable by the processing component 922, e.g. application program. The application program stored in the memory 932 may include one or more modules, each of which corresponds to one group of instructions. Further, the processing component 922 is configured to execute instructions to implement any one of the above-mentioned methods applied to the base station, for example, the methods shown in FIGS. 2 to 3.

The base station 900 may further include one power supply component 926 configured to perform power management of the device base station 900, one wireless or wired network interface 950 configured to connect the base station 900 to a network, and one input/output (I/O) interface 958. The base station 900 may be operated based on an operating system stored in the memory 932, for example, Windows Server™, Mac OS X™, Unix™, Linux™, FreeBSD™ or the like.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

The invention claimed is:

1. A data transmission scheduling method, being applied to a base station, comprising:
    transmitting a first scheduling instruction to a User Equipment (UE) in a N-th time domain unit, wherein the first scheduling instruction schedules the UE to transmit uplink data in a (N+K)-th time domain unit, and the N and the K are both natural numbers;
    transmitting, between the N-th time domain unit and the (N+K)-th time domain unit, at least one second scheduling instruction to the UE, wherein the second scheduling instruction schedules the UE to transmit uplink data, and the second scheduling instruction schedules retransmission data;
    receiving the retransmission data transmitted by the UE based on the second scheduling instruction; and
    performing combined detection on the uplink data transmitted based on the first scheduling instruction and the retransmission data transmitted based on the second scheduling instruction, wherein the combined detection comprises: deleting a duplicate part between the uplink data transmitted based on the first scheduling instruction and the retransmission data transmitted based on the second scheduling instruction.

2. The method according to claim 1, further comprising:
    receiving and caching, in response to determining that the second scheduling instruction schedules the retransmission data, the uplink data transmitted by the UE based on the first scheduling instruction.

3. The method according to claim 1, wherein at least one bit of the second scheduling instruction indicates scheduling the retransmission data.

4. The method according to claim 1, further comprising at least one of the following:
transmitting the first scheduling instruction to the UE through a Physical Downlink Control CHannel (PDCCH);
or
transmitting the at least one second scheduling instruction to the UE through the PDCCH.

5. The method according to claim 1, further comprising at least one of the following:
receiving, through a Physical Uplink Shared CHannel (PUSCH), the uplink data transmitted by the UE based on the first scheduling instruction;
or
receiving, through the PUSCH, the retransmission data transmitted by the UE based on the second scheduling instruction.

6. The method according to claim 1, wherein a time domain unit comprises a slot or a symbol.

7. A non-transitory computer readable storage medium, wherein the storage medium stores a computer executable program, when the computer executable program is executed by a processor, the data transmission scheduling method according to claim 1 is implemented.

8. A data transmission scheduling method, being applied to a User Equipment (UE), comprising:
receiving a first scheduling instruction transmitted by a base station in a N-th time domain unit, wherein the N is a natural number;
transmitting uplink data in a (N+K)-th time domain unit based on the first scheduling instruction, wherein the K is natural number;
receiving a second scheduling instruction transmitted by the base station between the N-th time domain unit and the (N+K)-th time domain unit; and
transmitting uplink data based on the second scheduling instruction;
wherein the transmitting uplink data based on the second scheduling instruction comprises:
transmitting retransmission data based on the second scheduling instruction, wherein combined detection is performed on the uplink data transmitted based on the first scheduling instruction and the retransmission data transmitted based on the second scheduling instruction, and the combined detection comprises: deleting a duplicate part between the uplink data transmitted based on the first scheduling instruction and the retransmission data transmitted based on the second scheduling instruction.

9. The method according to claim 8, wherein at least one bit of the second scheduling instruction indicates scheduling the retransmission data.

10. The method according to claim 8, further comprising at least one of the following:
receiving, through a Physical Downlink Control CHannel (PDCCH), the first scheduling instruction transmitted by the base station;
or
receiving, through the PDCCH, the second scheduling instruction transmitted by the base station.

11. The method according to claim 8, further comprising at least one of the following:
transmitting, through a Physical Uplink Shared CHannel (PUSCH), the uplink data in the (N+K)-th time domain unit based on the first scheduling instruction;
or
transmitting, through the PUSCH, the uplink data based on the second scheduling instruction.

12. The method according to claim 8, wherein a time domain unit comprises a slot or a symbol.

13. A communication device, comprising:
a processor,
a memory for storing instructions executable by the processor;
wherein the processor is configured to perform the data transmission scheduling method according to claim 8 when running the executable instructions.

14. A non-transitory computer-readable storage medium, wherein the storage medium stores a computer executable program, when the computer executable program is executed by a processor, the data transmission scheduling method according to claim 8 is implemented.

15. A communication device, comprising:
a processor,
a memory for storing instructions executable by the processor;
wherein the processor is configured to perform operations comprising:
transmitting a first scheduling instruction to a User Equipment (UE) in a N-th time domain unit, wherein the first scheduling instruction schedules the UE to transmit uplink data in a (N+K)-th time domain unit, and the N and the K are both natural numbers; and
transmitting, between the N-th time domain unit and the (N+K)-th time domain unit, at least one second scheduling instruction to the UE, wherein the second scheduling instruction schedules the UE to transmit uplink data, and the second scheduling instruction schedules retransmission data;
receiving the retransmission data transmitted by the UE based on the second scheduling instruction; and
performing combined detection on the uplink data transmitted based on the first scheduling instruction and the retransmission data transmitted based on the second scheduling instruction, wherein the combined detection comprises: deleting a duplicate part between the uplink data transmitted based on the first scheduling instruction and the retransmission data transmitted based on the second scheduling instruction.

* * * * *